United States Patent
Rodriguez, Sr.

Patent Number: 5,477,206
Date of Patent: Dec. 19, 1995

[54] ANTI-CARJACKING APPARATUS

[76] Inventor: Richard Rodriguez, Sr., 3530 Decatur Ave. Apartment 4B, Bronx, N.Y. 10467

[21] Appl. No.: 113,049

[22] Filed: Aug. 31, 1993

[51] Int. Cl.$^6$ .................................................. B60R 25/10
[52] U.S. Cl. ..................... 340/430; 340/426; 340/425.5; 116/33; 307/10.2; 307/10.3
[58] Field of Search ..................................... 340/430, 426, 340/425.5; 116/33; 307/10.2, 10.3

[56] References Cited

U.S. PATENT DOCUMENTS

| | | | |
|---|---|---|---|
| 3,566,349 | 10/1967 | Loeble | 307/10.3 |
| 4,162,479 | 7/1979 | Nickell et al. | 340/430 |
| 4,958,142 | 9/1990 | Sayers | 307/10.2 |
| 5,172,094 | 12/1990 | Stadier | 307/10.2 |

Primary Examiner—John K. Peng
Assistant Examiner—Daryl C. Pope

[57] ABSTRACT

A new and improved anti-carjacking apparatus for a motor vehicle includes an open door sensor assembly and a first timer assembly actuated by the open door sensor assembly. A first switch actuator assembly is activated by the first timer assembly for a first predetermined period of time. The first timer assembly controls a ready state for the first predetermined period of time. A second timer assembly is actuated by the first timer assembly. The second timer assembly is actuated after actuation of the first timer assembly by a second predetermined period of time which is a delay period. A deactuation switch assembly is capable of being manually actuated by a person and is capable of deactuating the first timer assembly and the second timer assembly. A first alarm signal assembly is controlled by the second timer assembly and by the deactuation switch assembly, such that when the deactuation switch assembly is in a deactuation state prior to expiration of the delay period of the second timer assembly, the deactuation switch assembly prevents activation of the first alarm signal assembly, and such that, when the first alarm signal assembly has been activated, the deactuation switch assembly is capable of deactivating the first alarm signal assembly.

1 Claim, 5 Drawing Sheets

ANTI-CARJACKING APPARATUS

BACKGROUND OF THE INVENTION

1. Field of the Invention

The present invention relates generally to anti-theft devices for automobiles, and more particularly, to an apparatus for preventing theft of the automobile that is under the control of a driver.

2. Description of the Prior Art

Automobile theft is a common crime, and many innovations have been developed to counter auto theft. In this respect, there are a number of situations in which auto theft commonly take place. In one situation, the automobile is unattended. In this case, the thief breaks into the automobile, shunts the ignition switch, and drives away. In another situation, while the legitimate driver is present, the thief hijacks the automobile. In this case, the keys are already in the ignition, and the thief does not need to perform any actions on the electrical circuitry of the automobile.

The following U.S. patents disclose a number of such anti-theft innovations: U.S. Pat. Nos. 3,639,897; 3,656,102; 4,958,142; 5,061,915; and 5,079,538. All of these patents disclose anti-theft devices for automobiles that are unattended. That is, more specifically, none of the cited patents have a provision for stopping an automobile engine once it has been started; that is, this device will not thwart a car hijacking or "carjacking". In this respect, it would be desirable if an anti-theft device for an automobile were provided which helps prevent an automobile hijacking.

Another problem associated with some of the devices in the cited patents is the requirement that a specific sequence of events take place in order for the automobile to be started. In certain situations, such a device may prove to cause great inconvenience. For example, when a person leaves the automobile with a parking attendant at a parking garage, the parking attendant will not know how to restart the automobile when the patron returns. In this respect, it would be desirable if an anti-theft device for an automobile were provided which does not depend upon a sequence of events in order for the automobile to be started.

More specifically, U.S. Pat. No. 4,958,142 discloses an automobile theft deterrent system which employs two alarm systems. When a first alarm system operates, the second alarm system, under timer control, follows by spraying a would be thief with a pressurized, non-toxic, and non-corrosive irritant. In addition a siren or loudspeaker is also actuated by the second alarm system. This is a complex anti-theft system requiring two alarm systems. Moreover, if a thief is in any way harmed by being exposed to an irritant, in this litigious society, even a thief may bring a civil suit for damages against the owner of the automobile. In this respect, it would be desirable if an anti-theft device for an automobile were provided which does not employ any chemical irritants to be applied to a would be thief.

Also, more specifically, U.S. Pat. No. 5,061,915 discloses an anti-theft system for an automobile which includes a complex arrangement of interrelated relays and switches. The system is so complex that it is designed so that an operator can practice a sequence of disarming steps before actually using the invention in its intended way. In this respect, it would be desirable if an anti-theft device for an automobile were provided which is simple in operation and does need carrying out a complex series of arming or disarming steps.

Additional features would be desired in an anti-theft device for an automobile. A switch for enabling or disabling the automobile's ignition system should be concealed from immediate view by a driver as the driver is seated behind the steering wheel. By being concealed, it would be very difficult for a thief to locate it.

If an automobile is hijacked, the desired automobile anti-theft device should enable a hijacker to be able to take over the automobile and drive away for a limited period of time, at which the automobile engine is disabled and the automobile ceases to operate. More specifically, the automobile should be enabled for a predetermined period of time after the hijacking. This mode of operation will deter the thief from attacking the legitimate driver. Such danger to the legitimate driver would have a greater tendency to occur if the thief receives resistance from the legitimate driver or if an alarm sounds while the thief is in the presence of the legitimate driver as an alarm is sounded or as the automobile is disabled.

Often when a vehicle is hijacked, the legitimate driver is required to open the door next to the driver seat in order to permit the hijacker to get in the vehicle. Ordinarily a driver would not open his door while the motor is running. In this respect, it would be desirable if an anti-hijacking device were provided which is activated when a driver opens the driver side door with the motor running.

There are times when a vehicle user would not want the anti-hijacking apparatus to function in its protective way. Such a time is when the driver wishes to step out of the vehicle for short periods of time without turning the motor off. Such a time occurs on winter mornings when the driver starts the motor to begin a warming up process and gets out of the vehicle with the motor running to scrape ice or snow off of the windshield. Another occasion where the motor is running and the door is opened occurs when a valet takes the car for valet parking. Another occasion where the motor is running and the door is opened occurs when a passenger gets into the vehicle or exits the vehicle. In any such case when a door is opened for a legitimate reason with the motor running, a switch should be provided to deactivate the anti-hijacking system. More specifically, the deactivation switch should be hidden from view and in a secret location so that a hijacker would not be able to deactivate the system himself.

There may be times when a hijacker would enter from a door of the vehicle other than the driver's door. In this respect, it would be desirable if an anti-hijacking device were provided that is activated by opening a door, other than the driver's door, when the motor is running.

Once a hijacker hijacks the vehicle and drives it away from the legitimate driver, and once the anti-hijacking apparatus functions in its intended way to shut off of the motor and prevent a long drive away, it would be desirable if events took place that caused the hijacker to abandon the hijacked vehicle rather than stay with the vehicle and attempt a way to defeat the anti-hijacking apparatus. One way to induce the hijacker to leave the hijacked vehicle is to create an environment within the vehicle that deters the hijacker from remaining with the vehicle. One way to deter the hijacker from remaining with the hijacked vehicle is to create an oppressively loud noise within the vehicle. In this respect, it would be desirable if an anti-hijacking device were provided which creates an oppressively loud noise in the vehicle after the vehicle was hijacked.

Another way to encourage a hijacker to abandon the hijacked vehicle is to have the vehicle create alarm signals that draw attention to the vehicle and make it clear that an anti-theft alarm has been activated. More specifically, it would be desirable that, after the vehicle is hijacked, the vehicle exhibits flashing lights and sounds audible alarms to attract attention to the hijacked vehicle.

Thus, while the foregoing body of prior art indicates it to be well known to use anti-theft systems for motor vehicles, the prior art described above does not teach or suggest an anti-carjacking apparatus which has the following combination of desirable features: (1) helps prevent a vehicle hijacking; (2) does not depend upon a sequence of events in order for the vehicle motor to be started; (3) does not employ any chemical irritants to be applied to a would be thief; (4) is simple in operation and does need carrying out a complex series of arming or disarming steps; (5) is concealed from immediate view by a driver as the driver is seated behind the steering wheel; (6) permits the vehicle motor to operate for a predetermined period of time after the hijacking; (7) is activated when a driver opens the driver side door with the motor running; (8) includes a deactivation switch which is hidden from view and is in a secret location so that a hijacker is not able to deactivate the system himself; (9) is activated by opening a door, other than the driver's door, when the motor is running; (10) creates an oppressively loud noise in the vehicle after the vehicle is hijacked; and (11) after the vehicle is hijacked, the vehicle exhibits flashing lights to attract attention to the hijacked vehicle. The foregoing desired characteristics are provided by the unique anti-carjacking apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved anti-carjacking apparatus for a motor vehicle which includes an open door sensor assembly and a first timer assembly actuated by the open door sensor assembly. A first switch actuator assembly is activated by the first timer assembly for a first predetermined period of time. The first timer assembly controls a ready state for the first predetermined period of time. A second timer assembly is actuated by the first timer assembly. The second timer assembly is actuated after actuation of the first timer assembly by a second predetermined period of time which is a delay period. A deactuation switch assembly is capable of being manually actuated by a person and is capable of deactuating the first timer assembly and the second timer assembly.

A first alarm signal assembly is controlled by the second timer assembly and by the deactuation switch assembly, such that when the deactuation switch assembly is in a deactuation state prior to expiration of the delay period of the second timer assembly, the deactuation switch assembly prevents activation of the first alarm signal assembly, and such that, when the first alarm signal assembly has been activated, the deactuation switch assembly is capable of deactivating the first alarm signal assembly.

The anti-carjacking apparatus of the invention further includes a second switch actuator assembly, an ignition switch assembly, and a third switch actuator assembly, such that the second switch actuator assembly is activated by the first switch actuator assembly and the ignition switch assembly when the ignition switch assembly is in an on state and when the first switch actuator assembly is activated, and such that the second switch actuator assembly activates the third switch actuator assembly, and such that when the third switch actuator assembly is activated, the third switch actuator assembly activates the second timer assembly and activates itself to keep itself activated in the event that the ignition switch assembly is switched to an off state.

A fourth switch actuator assembly is controlled by the second timer assembly. The fourth switch actuator assembly is capable of controlling operation of the first alarm signal assembly.

The anti-carjacking apparatus of the invention further includes a second alarm signal assembly and a fifth switch actuator assembly controlled by the second timer assembly. The fifth switch actuator assembly is capable of controlling operation of the second alarm signal assembly.

The anti-carjacking apparatus of the invention includes a third alarm signal assembly which is controlled by the fifth switch actuator assembly which is controlled by the second timer assembly.

The anti-carjacking apparatus of the invention includes a fourth alarm signal assembly controlled by the fifth switch actuator assembly which is controlled by the second timer assembly. The fourth alarm signal assembly includes a tethered metal ball assembly located outside a passenger compartment of the motor vehicle. The tethered metal ball assembly includes a solenoid assembly, a metal ball which is capable of being retained by the solenoid assembly when the solenoid assembly is energized, and a tether connected at one end to the solenoid assembly and at another end to the metal ball. The tether is capable of preventing the metal ball from being lost when the solenoid assembly is deenergized and the metal ball separates from the solenoid assembly.

The first switch actuator assembly, the second switch actuator assembly, the third switch actuator assembly, the fourth switch actuator assembly, and the fifth switch actuator assembly are preferably comprised of relay assemblies.

The first predetermined period of time is approximately five minutes. The second predetermined period of time is approximately twenty-three seconds.

A third timer assembly is controlled by the second timer assembly. The third timer assembly is capable of running for a third predetermined period of time. A sixth switch actuator assembly is activated by the third timer assembly. A fourth timer assembly is controlled by the sixth switch actuator assembly. The fourth timer assembly is capable of running for a fourth predetermined period of time, and a seventh switch actuator assembly is activated by the sixth switch actuator assembly. The seventh switch actuator assembly is capable of disabling a starter motor solenoid for the motor vehicle.

The third predetermined period of time is approximately seven seconds. The fourth predetermined period of time is approximately ten minutes.

An eighth switch actuator assembly is controlled by the sixth switch actuator assembly, and a fifth alarm signal assembly is controlled by the eighth switch actuator assembly. The fifth alarm signal assembly includes an inside siren whose sound is directed to inside a passenger compartment of the motor vehicle. The eighth switch actuator assembly is also capable of switching an ignition switch of the motor vehicle to an off state. A sixth alarm signal assembly is controlled by the eighth switch actuator assembly.

The sixth alarm signal assembly includes an inside smoke generator whose smoke is directed to inside a passenger compartment of the motor vehicle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved anti-carjacking apparatus which has all of the advantages of the prior art and none of the disadvantages.

It is another object of the present invention to provide a new and improved anti-carjacking apparatus which may be easily and efficiently manufactured and marketed.

It is a further object of the present invention to provide a new and improved anti-carjacking apparatus which is of durable and reliable construction.

An even further object of the present invention is to provide a new and improved anti-carjacking apparatus which is susceptible of a low cost of manufacture with regard to both materials and labor, and which accordingly is then susceptible of low prices of sale to the consuming public, thereby making such anti-carjacking apparatus available to the buying public.

Still yet a further object of the present invention is to provide a new and improved anti-carjacking apparatus which helps prevent a vehicle hijacking.

Still another object of the present invention is to provide a new and improved anti-carjacking apparatus that does not depend upon a sequence of events in order for the vehicle motor to be started.

Yet another object of the present invention is to provide a new and improved anti-carjacking apparatus which does not employ any chemical irritants to be applied to a would be thief.

Even another object of the present invention is to provide a new and improved anti-carjacking apparatus that is simple in operation and does need carrying out a complex series of arming or disarming steps.

Still a further object of the present invention is to provide a new and improved anti-carjacking apparatus which is concealed from immediate view by a driver as the driver is seated behind the steering wheel.

Yet another object of the present invention is to provide a new and improved anti-carjacking apparatus that permits the vehicle motor to operate for a predetermined period of time after the hijacking.

Still another object of the present invention is to provide a new and improved anti-carjacking apparatus which is activated when a driver opens the driver side door with the motor running.

Yet another object of the present invention is to provide a new and improved anti-carjacking apparatus that includes a deactivation switch which is hidden from view and is in a secret location so that a hijacker is not able to deactivate the system himself.

Still a further object of the present invention is to provide a new and improved anti-carjacking apparatus that is activated by opening a door, other than the driver's door, when the motor is running.

Yet another object of the present invention is to provide a new and improved anti-carjacking apparatus which creates an oppressively loud noise in the vehicle after the vehicle is hijacked.

Still a further object of the present invention is to provide a new and improved anti-carjacking apparatus that after the vehicle is hijacked, the vehicle exhibits flashing lights to attract attention to the hijacked vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved anti-carjacking apparatus embodying the principles and concepts of the present invention will be described.

Figure 1:
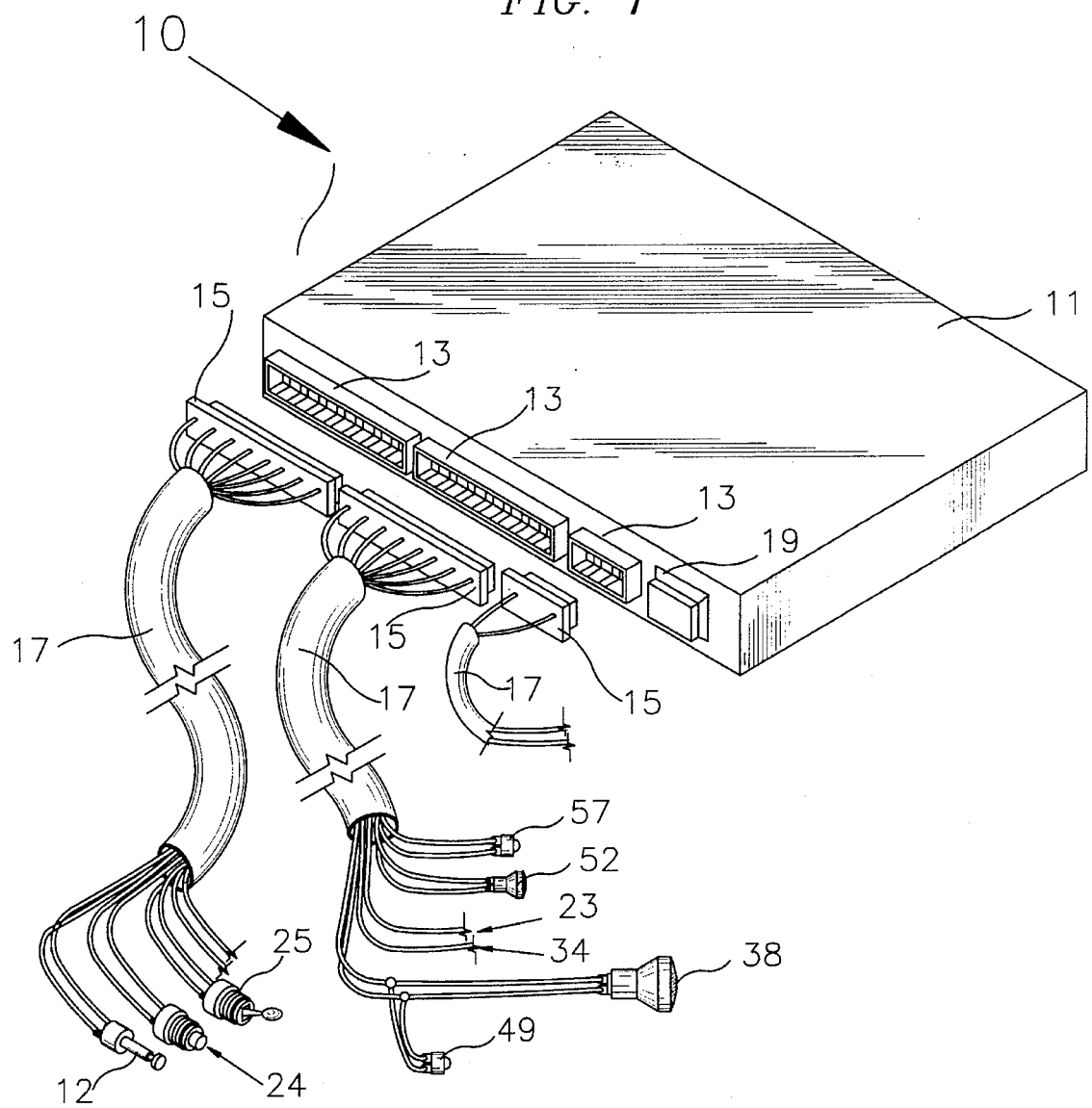
FIG. 1 is a perspective, partially exploded view of a first preferred embodiment of the anti-carjacking apparatus of the invention.
Figure 2:
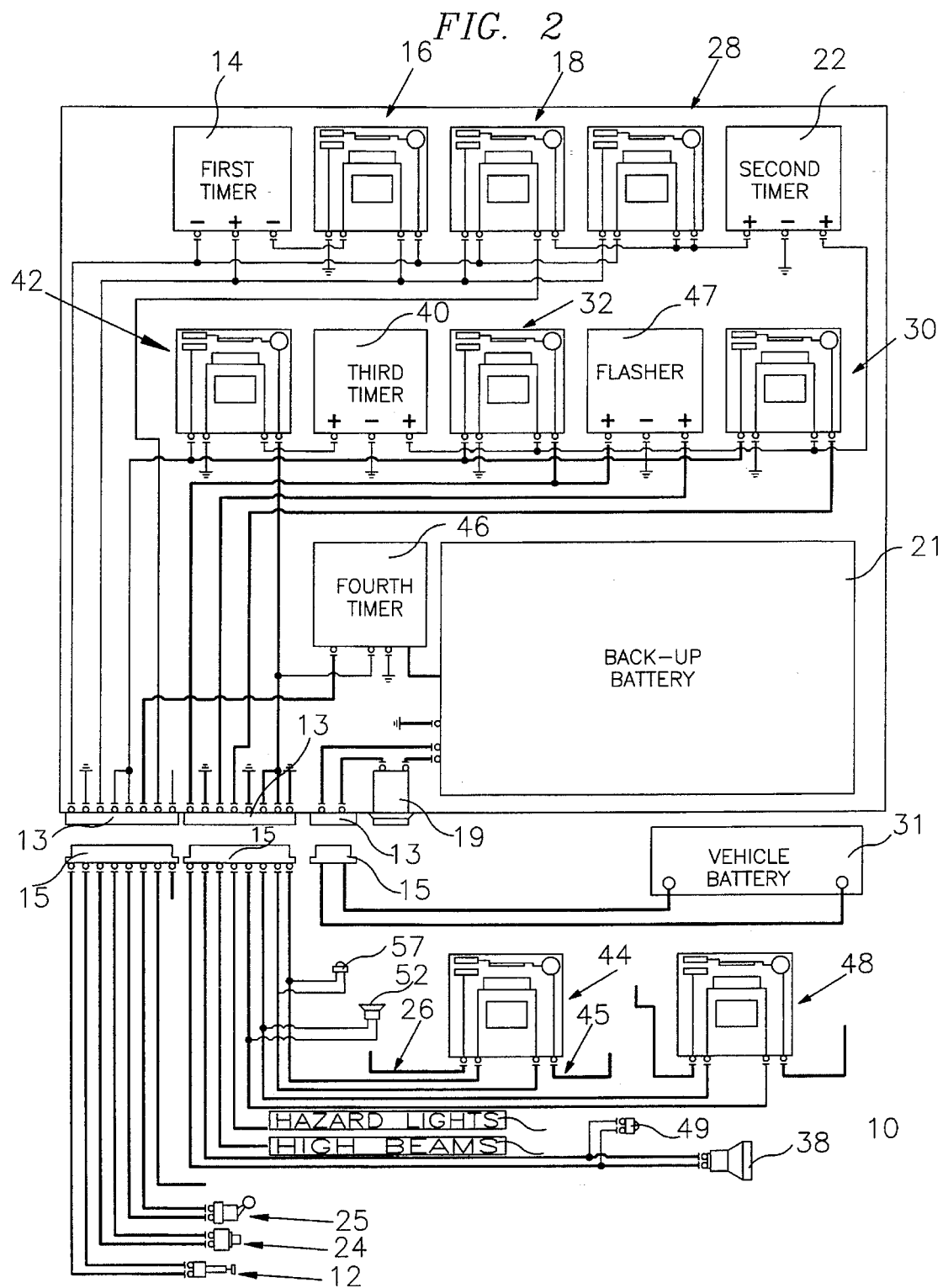
FIG. 2 is an electrical schematic diagram for the embodiment of the invention shown in FIG. 1.

Turning initially to FIGS. 1–2, there is shown a first exemplary embodiment of the anti-carjacking apparatus of the invention generally designated by reference numeral 10. A housing 11 is provided to house many of the system components, especially the signal processing components. First connectors 13 are present on the housing 11. The first connectors 13 are connected to complementary second connectors 15. Wires running from the housing 11 can be arranged in multiple conductor cables 17. A fuse 19 is also provided. A back-up battery 21 is also provided. A vehicle battery 31 normally powers the system. In its preferred form, anti-carjacking apparatus 10 includes an open door sensor assembly 12 and a first timer assembly 14 actuated by the open door sensor assembly 12. A first switch actuator assembly 16 is activated by the first timer assembly 14 for a first predetermined period of time. The first timer assembly 14 controls a ready state for the first predetermined period of time. A second timer assembly 22 is actuated by the first timer assembly 14. The second timer assembly 22 is actuated after actuation of the first timer assembly 14 by a second predetermined period of time which is a delay period. A deactuation switch assembly 24 is capable of being manually actuated by a person and is capable of deactuating the first timer assembly 14 and the second timer assembly 22.

A first alarm signal assembly 23 is controlled by the second timer assembly 22 and by the deactuation switch assembly 24, such that when the deactuation switch assembly 24 is in a deactuation state prior to expiration of the delay period of the second timer assembly 22, the deactuation switch assembly 24 prevents activation of the first alarm signal assembly 23, and such that, when the first alarm signal assembly 23 has been activated, the deactuation switch assembly 24 is capable of deactivating the first alarm signal assembly 23.

The anti-carjacking apparatus of the invention further includes a second switch actuator assembly 18, an ignition switch assembly 26, and a third switch actuator assembly 28, such that the second switch actuator assembly 18 is activated by the first switch actuator assembly 16 and the ignition switch assembly 26 when the ignition switch assembly 26 is in an on state and when the first switch actuator assembly 16 is activated, and such that the second switch actuator assembly 18 activates the third switch actuator assembly 28, and such that when the third switch actuator assembly 28 is activated, the third switch actuator assembly 28 activates the second timer assembly 22 and activates itself to keep itself activated in the event that the ignition switch assembly 26 is switched to an off state.

A fourth switch actuator assembly 30 is controlled by the second timer assembly 22. The fourth switch actuator assembly 30 is capable of controlling operation of the first alarm signal assembly 23. The first alarm signal assembly 23 includes hazard lights.

A second alarm signal assembly 34 and a fifth switch actuator assembly 32 are controlled by the second timer assembly 22. The fifth switch actuator assembly 32 is capable of controlling operation of the second alarm signal assembly 34. The second alarm signal assembly 34 includes high beam lamps of a headlight assembly.

A third alarm signal assembly 36 is controlled by the fifth switch actuator assembly 32 which is controlled by the second timer assembly 22. The third alarm signal assembly 38 includes an outside siren 38 whose sound is directed to outside the motor vehicle.

Figure 3:
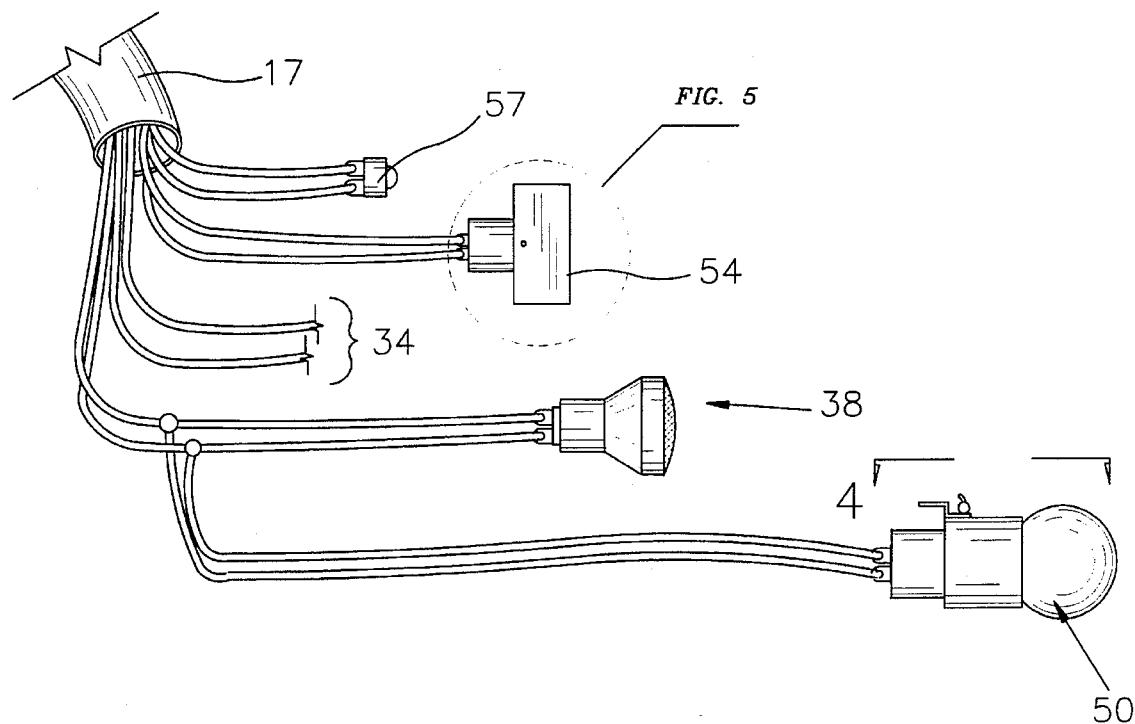
FIG. 3 is a partial top view of a second embodiment of the invention of the anti-carjacking apparatus which includes a smoke container for inside the vehicle and a tethered metal ball assembly for outside the vehicle.
Figure 4:
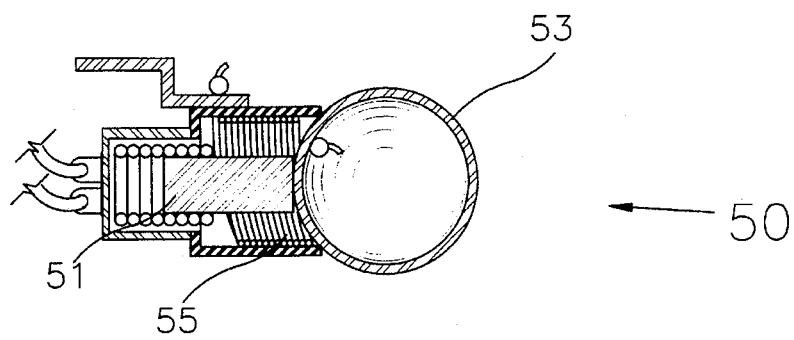
FIG. 4 is an enlarged cross-sectional view of the tethered metal ball assembly shown in FIG. 3.
Figure 6:
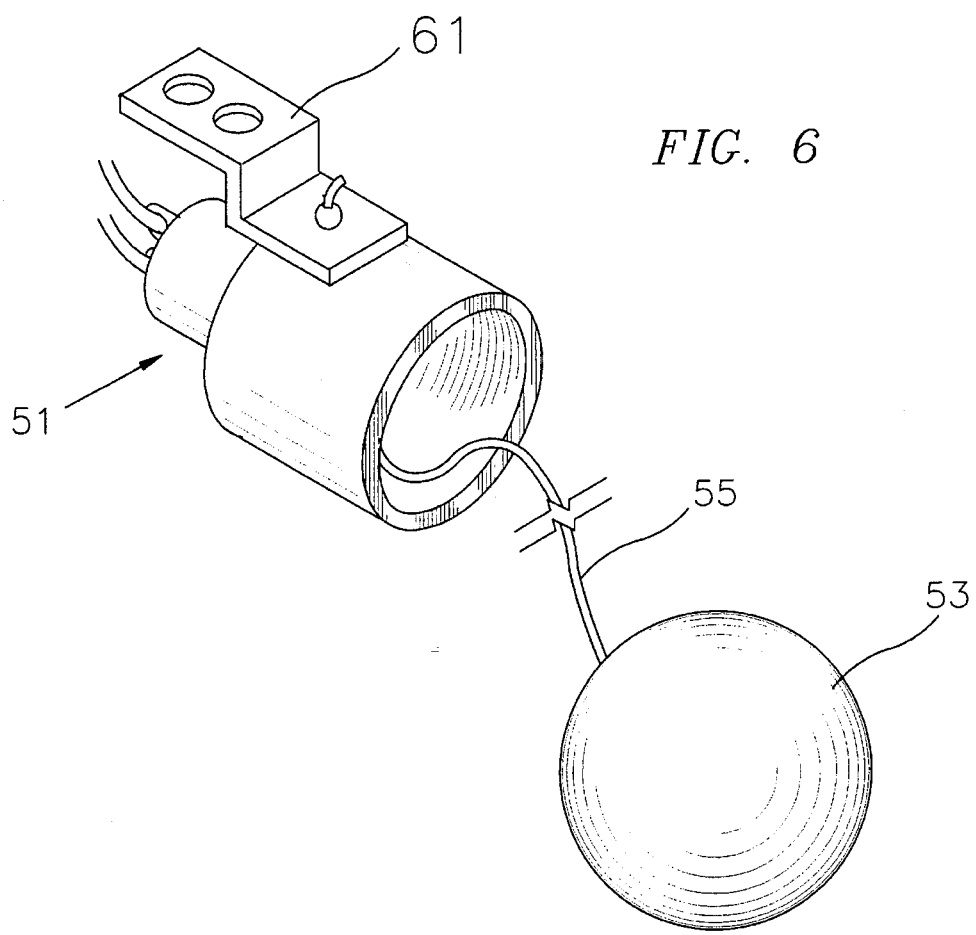
FIG. 6 is an enlarged perspective view of the tethered ball assembly shown in FIG. 3 with the ball being dragged by the tether.

A fourth alarm signal assembly 50 is controlled by the fifth switch actuator assembly 32 which is controlled by the second timer assembly 22. As shown in FIGS. 3, 4, and 6, the fourth alarm signal assembly 50 includes a tethered metal ball assembly 50 located outside a passenger compartment of the motor vehicle. The tethered metal ball assembly 50 includes a solenoid assembly 51, a metal ball 53 which is capable of being retained by the solenoid assembly 51 when the solenoid assembly 51 is energized, and a tether 55 connected at one end to the solenoid assembly 51 and at another end to the metal ball 53. The tether 55 is capable of preventing the metal ball 53 from being lost when the solenoid assembly 51 is deenergized and the metal ball 53 separates from the solenoid assembly 51. When the metal ball 53 separates from the solenoid assembly 51, it drags behind the motor vehicle on the tether 55. As such it creates a scraping noise as it bounces on the road surface, and creates an unusual visual image for observers. It is a strange sight to see a motor vehicle riding along with a tethered ball bouncing behind it. This tethered ball makes it easy for a law enforcement officer to identify a hijacked motor vehicle. A bracket 61 is used to attach the tethered metal ball assembly 50.

The first switch actuator assembly 16, the second switch actuator assembly 18, the third switch actuator assembly 20, the fourth switch actuator assembly 30, and the fifth switch actuator assembly 32 are preferably comprised of relay assemblies.

The first predetermined period of time is approximately five minutes. The second predetermined period of time is approximately twenty-three seconds.

A third tinier assembly 40 is controlled by the second timer assembly 22. The third timer assembly 40 is capable of running for a third predetermined period of time. A sixth switch actuator assembly 42 is activated by the third timer assembly 40. A fourth timer assembly 46 is controlled by the sixth switch actuator assembly 42. The fourth timer assembly 46 is capable of running for a fourth predetermined period of time, and a seventh switch actuator assembly 44 is activated by the sixth switch actuator assembly 42. The seventh switch actuator assembly 44 is capable of disabling a starter motor solenoid 45 for the motor vehicle.

The third predetermined period of time is approximately seven seconds. The fourth predetermined period of time is approximately ten minutes.

Figure 7:
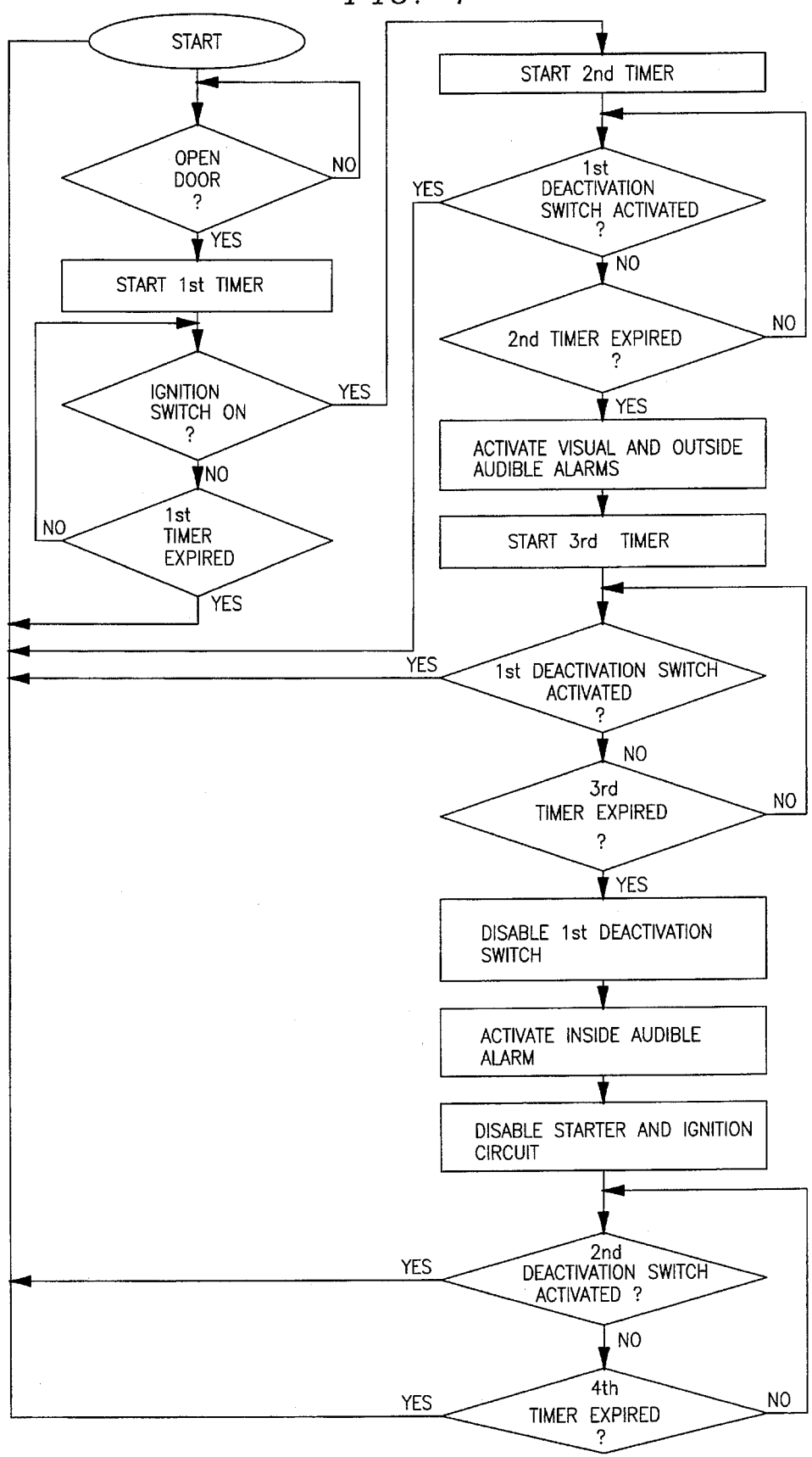
FIG. 7 is a block diagram illustration of an operation of the present invention.

FIG. 7 is a block diagram illustration of an operation of the present invention.

An eighth switch actuator assembly 48 is controlled by the sixth switch actuator assembly 42, and a fifth alarm signal assembly 52 is controlled by the eighth switch actuator assembly 48. The fifth alarm signal assembly 52 includes an inside siren 52 whose sound is directed to inside a passenger compartment of the motor vehicle. The eighth switch actuator assembly 48 is also capable of switching an ignition switch of the motor vehicle to an off state. A sixth alarm signal assembly 54 is controlled by the eighth switch actuator assembly 48.

Figure 5:
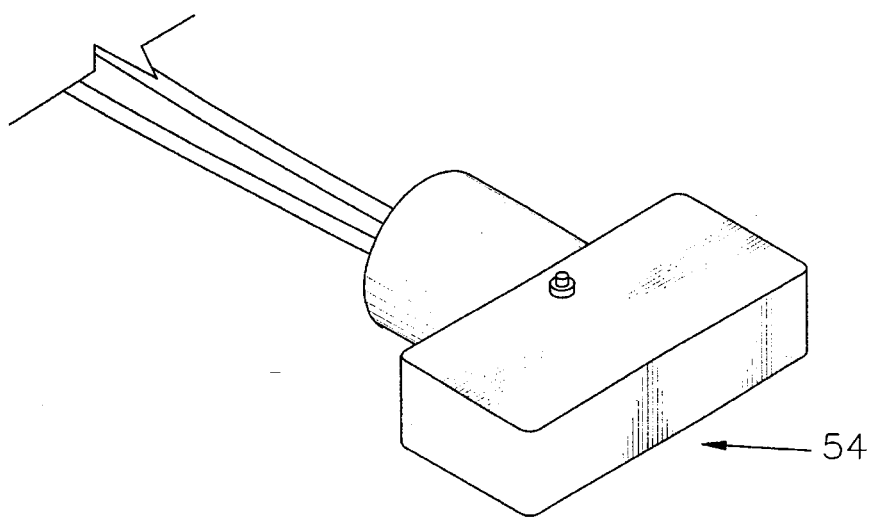
FIG. 5 is an enlarged perspective view of a smoke container shown in FIG. 3.

As shown in FIGS. 3 and 5, the sixth alarm signal assembly 54 includes an inside smoke generator 54 whose smoke is directed to inside a passenger compartment of the motor vehicle.

Referring now to FIG. 7 and with respect to operation of the anti-carjacking apparatus of the invention, once the apparatus of the invention is installed in a motor vehicle, opening any door will activate any open door sensor assembly 12, and the first timer assembly 14 will activate the first switch actuator assembly 16 for a first predetermined time period of 5 minutes for a Ready State of 5 minutes. When energized, the first switch actuator assembly 16 will supply ground (−) to the second switch actuator assembly 18, the third switch actuator assembly 28, and back to the first timer assembly 14 to maintain ground after the door is closed.

If the ignition switch assembly 26 is already in the on state when the door is opened, or if the ignition switch assembly 26 is turned to the on state within the 5 minute Ready State, the system immediately starts. When the ignition switch assembly 26 is in the on state, power (+) is supplied to the second switch actuator assembly 18. When (+) power and (−) ground are simultaneously supplied to the second switch actuator assembly 18, it energizes and supplies power to the third switch actuator assembly 28. When (+) power and (−) ground are simultaneously supplied to the third switch actuator assembly 28, it energizes and supplies power to the second timer assembly 22 and back to itself to maintain power in the event the ignition switch assembly 26 is turned to the off state.

Approximately 23 seconds after the system starts, if the deactuation switch assembly 24 has not been switched to the deactuation state, the high beams of the headlights, the four-way hazard lights 23, and a small yellow warning light 25 on the dashboard begin to flash. Also, the outside siren 38 begins to sound. Also, after approximately 23 seconds, the second timer assembly 22 supplies power to the fourth switch actuator assembly 30, the fifth switch actuator assembly 32, and the third timer assembly 40. When energized, the fourth switch actuator assembly 30 supplies power to the four-way hazard lights. When energized, the fifth switch actuator assembly 32 supplies power to the highbeam flasher 47, the small yellow dashboard light 49, and the outside siren 38.

Seven seconds later, the starter solenoid becomes disabled, and the ignition switch assembly 26 switches to the off state. In addition, the inside siren 52 begins to sound its piercing sound, and a small red light 57 on the dashboard turns on. Also, after the 7 seconds, the deactuation switch assembly 24, hidden somewhere in the passenger compartment, such as in the glove compartment, becomes disabled. A second disabling switch 25 can also be used. Also after the 7 seconds, the third timer assembly 40 energizes the sixth switch actuator assembly 42. When the sixth switch actuator assembly 42 is energized, the sixth switch actuator assembly 42 energizes the seventh switch actuator assembly 44 and the eighth switch actuator assembly 48. The eighth switch actuator assembly 48 supplies power to the fifth alarm signal assembly 52 (the inside siren 52), the small red light 57, the fourth timer assembly 46, and back to itself to maintain power in the event that the deactuation switch assembly 24 is switched to the deactuation state.

When the seventh switch actuator assembly 44 is energized, it disables the solenoid 45 of the starter motor of the motor vehicle. When the eighth switch actuator assembly 48 is actuated, the eighth switch actuator assembly 48 opens up the ignition circuit. Under the control of the fourth timer assembly 46, the anti-carjacking apparatus of the invention will automatically turn off and reset after 10 minutes. More specifically, the fourth timer assembly 46 will shut off the supply of power going to the system of the invention and resets the system so that the system is capable of entering the Ready State.

The components of the anti-carjacking apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved anti-carjacking apparatus that is low in cost, relatively simple in design and operation, and which may advantageously be used to help prevent a vehicle hijacking. With the invention, an anti-carjacking apparatus is provided which does not depend upon a sequence of events in order for the vehicle motor to be started. With the invention, an anti-carjacking apparatus is provided which does not employ any chemical irritants to be applied to a would be thief. With the invention, an anti-carjacking apparatus is provided which is simple in operation and does need carrying out a complex series of arming or disarming steps. With the invention, an anti-carjacking apparatus is provided which is concealed from immediate view by a driver as the driver is seated behind the steering wheel. With the invention, an anti-carjacking apparatus is provided which permits the vehicle motor to operate for a predetermined period of time after the hijacking. With the invention, an anti-carjacking apparatus is provided which is activated when a driver opens the driver side door with the motor running. With the invention, an anti-carjacking apparatus is provided which includes a deactivation switch which is hidden from view and is in a secret location so that a hijacker is not able to deactivate the system himself. With the invention, an anti-carjacking apparatus is provided which is activated by opening a door, other than the driver's door, when the motor is running. With the invention, an anti-carjacking apparatus is provided which creates an oppressively loud noise in the vehicle after the vehicle is hijacked. With the invention, an anti-carjacking apparatus is provided which after the vehicle is hijacked, the vehicle exhibits flashing lights to attract attention to the hijacked vehicle.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A method of disabling a vehicle comprising the steps:

providing a vehicle having a door, an ignition switch, an ignition circuit, a starting device, a visual alarm, and an exterior audible alarm;

providing an interior audible alarm mounted within a passenger compartment of the vehicle;

providing a first deactivation switch and a second deactivation switch, the deactivation switches being hidden in separate locations within the vehicle;

starting a cycle of operation of the method;

monitoring the door of the vehicle;

starting a first time period upon sensing an opening of the door of the vehicle;

monitoring the ignition switch of the vehicle;

starting a second time period upon sensing an actuation of the ignition switch of the vehicle before the first time period has expired;

monitoring the first deactivation switch;

restarting the cycle of operation upon an actuation of the first deactivation switch;

waiting for the second time period to expire;

actuating both the visual alarm and the exterior audible alarm of the vehicle;

starting a third time period;

monitoring the first deactivation switch;

restarting the cycle of operation upon an actuation of the first deactivation switch;

waiting for the third time period to expire;

disabling the first deactivation switch;

actuating the interior audible alarm;

disabling the ignition circuit and the starting device of the vehicle;

starting a fourth time period;

monitoring the second deactivation switch;

restarting the cycle of operation upon an actuation of the second deactivation switch; and, restarting the cycle of operation upon an expiration of the fourth time period.

* * * * *